United States Patent

[11] 3,595,385

| | | |
|---|---|---|
| [72] | Inventor | Joseph H. Duff<br>Basking Ridge, N.J. |
| [21] | Appl. No. | 829,527 |
| [22] | Filed | June 2, 1969 |
| [45] | Patented | July 27, 1971 |
| [73] | Assignee | Union Tank Car Company<br>Chicago, Ill. |

[54] METHOD AND APPARATUS FOR CONTROLLING LEVELS IN AN ION EXCHANGE RESIN SEPARATOR
20 Claims, 1 Drawing Fig.

[52] U.S. Cl................................................ 209/1,
209/160, 209/497, 210/33, 210/89, 214/17 CA,
340/244 R
[51] Int. Cl................................................ B03b 13/00
[50] Field of Search........................................... 210/33, 86,
189; 209/158, 160, 489, 491, 499, 496, 161, 488,
1, 497; 214/17 CA; 340/244

[56] References Cited
UNITED STATES PATENTS

| | | | |
|---|---|---|---|
| 2,696,305 | 12/1954 | Slover .......................... | 214/17 CA |
| 2,696,462 | 12/1954 | Bodkin ........................ | 210/33 X |
| 2,767,140 | 10/1956 | Fitch ........................... | 210/33 |
| 2,771,407 | 11/1956 | Penick.......................... | 210/189 X |
| 2,952,621 | 9/1960 | McClure ...................... | 208/166 |
| 3,246,757 | 4/1966 | Martin.......................... | 210/86 |
| 3,512,640 | 5/1970 | Hellmann ..................... | 210/189 X |
| 2,990,543 | 6/1961 | Rod.............................. | 340/244 |

*Primary Examiner*—Frank W. Lutter
*Assistant Examiner*—Ralph J. Hill
*Attorneys*—Hume, Clement, Hume & Lee and Charles M. Kaplan

ABSTRACT: An improved method and apparatus are provided for controlling both the resin level and the quantity of fines above the resin in an anion-cation exchange resin separation column. In carrying out the method, the presence of fines is sensed at a given level within the resin separation zone, and resin is delivered to the zone when its level falls below this given level. The presence of fines within the separation zone is also sensed at a second level above this given level. If fines are present, an alarm may be sounded, fines may be removed from the separation zone, or both the alarm and fines removal functions may be performed.

The apparatus comprises an ion exchange resin separation column having a bead resin level sensor in an upper portion and a fines level sensor above the bead resin level sensor. Valve means are controlled responsive to a signal from the bead resin level sensor in order to maintain the proper bead resin level with the column. The apparatus may alternatively employ alarm means, fines removal means, or a combination thereof, operating responsive to a signal from the fines level sensor.

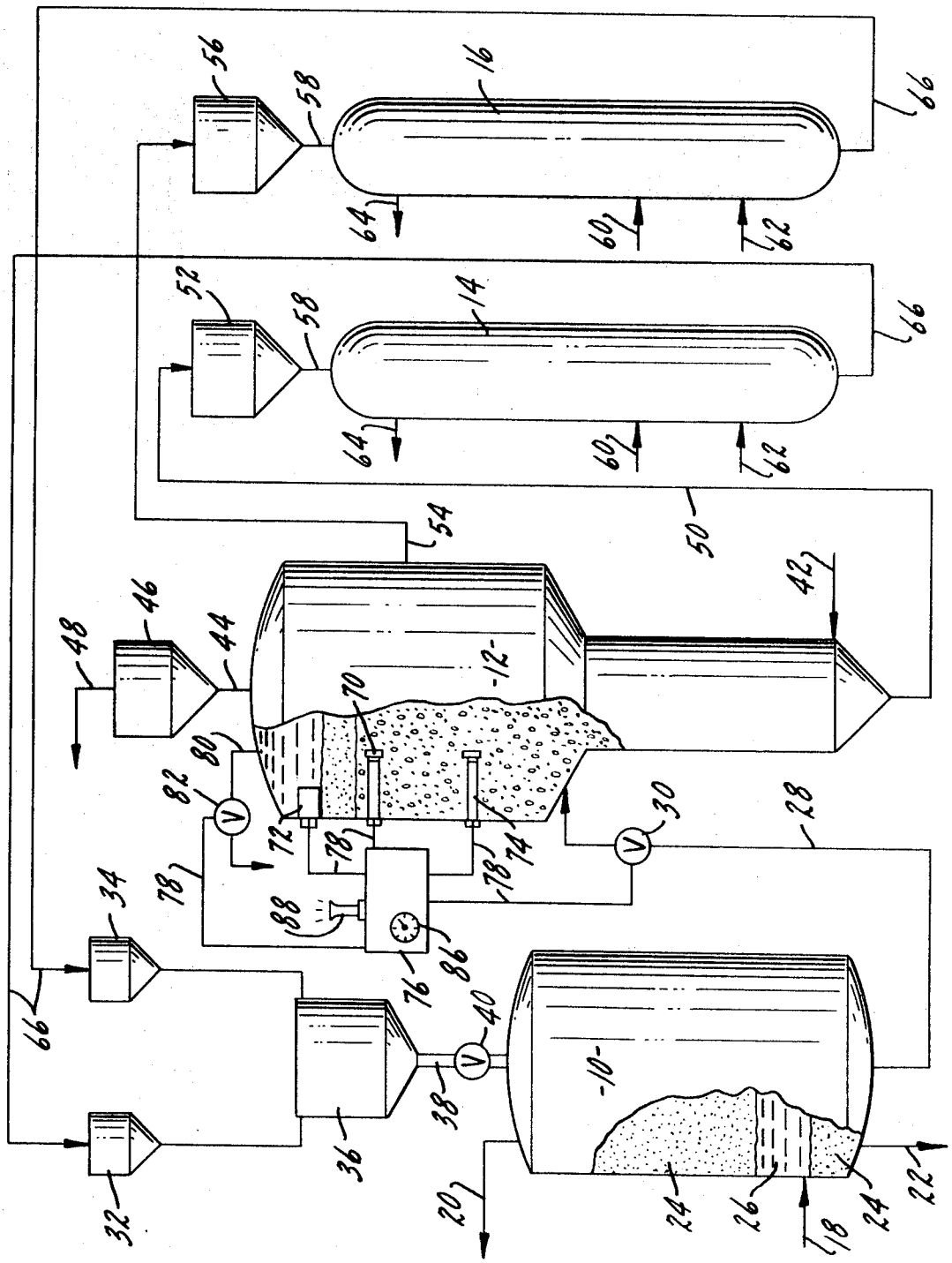

METHOD AND APPARATUS FOR CONTROLLING LEVELS IN AN ION EXCHANGE RESIN SEPARATOR

The present invention relates to an improved method and apparatus for controlling the level of solids in a liquid, and more particularly to an improved method and apparatus for controlling the level of resin and fines in an ion exchange resin separation zone.

Mixed bed ion exchange resin systems are acquiring increasing commercial importance in the field of water purification. One particularly successful system employs a service or adsorption zone, a separation zone, a cation regeneration or cation desorption zone, and an anion regeneration or anion desorption zone. These various zones are defined by suitable tanks, generally referred to in the art as columns. Water for purification is delivered under pressure in an upflow direction through a mixture of anion and cation resin beads in the service column. This pressure is also used to provide the motive force to deliver exhausted resin beads from the bottom of the service column to the separation column, wherein the anion and cation resins in the mixed bed are separated according to their densities. Since the exhausted anion resin beads are less dense than the exhausted cation resin beads, the anion resin will be carried upwardly in an upwardly moving flow of water in the separation column, while the cation resin will sink to the bottom. Cation resin beads are removed from a lower portion of the separation column and delivered to the cation regeneration zone, while the anion resin beads are removed from an upper portion of the separation column and delivered to the anion resin regeneration zone. This resin transfer is accomplished primarily under the influence of pressure within the separation column.

Obviously, careful control of the separation column is essential, since separation of the anion and cation resins must be as complete as possible. It is therefore important to maintain a constant, carefully controlled upflow of water within the separation column, and also to maintain a reasonably constant resin level. An additional problem encountered in the separation column is the formation of a layer of finely divided resin particles, along with particulate impurities, referred to collectively as "fines," above the level of the bead resin within the separation column. These fines can interfere with the separation operation and can contaminate the resin. The normal upflow of water within the separation column is insufficient to remove these fines. Accordingly, it is necessary for an operator to monitor the separation column, and to manually cause the fines to be removed when their quantity becomes excessive. This monitoring requires an inordinate amount of time from the operator.

Generally, the present invention relates to an improved method for simultaneously controlling both fines and the resin level within a resin separation zone that is filled with liquid and contains ion exchange resin. Basically, the method comprises the sensing of the presence or absence of bead resin at a given level within the zone, which represents the desired level of the resin. The delivery of resin to the zone is controlled in response to the absence or presence of bead resin at the given level to maintain the level of the bead resin relatively constant at the given level. In addition, the presence or absence of fines is sensed at a second level above the given level, and an alarm is sounded when fines are sensed at this second level. As an alternative embodiment, rather than sounding an alarm when fines are sensed at the second level, the fines may simply be automatically removed from an upper portion of the separation zone when the fines are sensed at this second level.

The invention also provides apparatus for controlling resin within the separation column. Such apparatus comprises a bead resin level sensor positioned in an upper portion of the separation column and a fines level sensor positioned in the column above the bead resin level sensor. Resin transfer means communicate with the separation column for delivering exhausted resin to the column, and valve means are located on the resin transfer means. Control means are provided for operating the valve responsive to a signal from the bead resin level sensor, while alarm means are provided operating responsive to the fines level sensor. Alternatively, in place of the alarm means, the apparatus may be provided with means for removing fines from an upper portion of the separation column responsive to a signal from the fines level sensor.

The invention, its preferred embodiments and method of operation, will be best understood by reference to the following detailed description, taken in conjunction with the drawing, which is a diagrammatic illustration of an ion exchange resin system incorporating the features of the present invention.

Referring to the drawing, the ion exchange system illustrated is a basic mixed-bed system having a service or adsorption column 10, a separation column 12, a cation resin regeneration or desorption column 14, and an anion resin regeneration or desorption column 16.

The service column 10 has a raw water inlet 18 at a lower portion thereof, a treated water outlet 20 communicating with an upper portion, and a liquid discharge outlet 22 communicating with the service column 10 at the bottom. In normal operation water under pressure is passed through ion exchange resin 24 in the service column 10 in an upflow direction. As shown in the drawing, the inflow of water through the raw water inlet 18 produces a separation or gap 26 in the ion exchange resin 24. The resin 24 below the gap 26 is urged by pressure out of the column 10 through an exhausted resin transfer line 28 which communicates with the separation column 12. A valve 30 is located on the exhausted resin transfer line 28, so that the flow of resin from the service column 10 may be controlled. It is preferred that the exhausted resin transfer line 28 communicate with the separation column 12 at approximately the point of normal separation between the anion and cation resins, so that a minimum of disturbance will be produced by the introduction of exhausted resin into the separation column 12.

Fresh resin which has been regenerated in the regeneration columns 14, 16 is retained above the service column 10 in a cation resin metering hopper 32 and an anion resin metering hopper 34. A mixing hopper 36 is positioned below the metering hoppers 32, 34, and above the service column 10. Regenerated resin in the metering hoppers 32, 34 is periodically transferred to the mixing hopper 36, wherein anion and cation resins are mixed. A resin inlet line 38 having a valve 40 provides communication between the mixing hopper 36 and an upper portion of the service column 10. When it is desired to supply fresh resin to the service column 10, the raw water inlet 18 is closed, and the column is depressurized by opening the liquid discharge outlet 22. This allows the resin 24 in the service column 10 to move downwardly, closing the gap 26. At the same time, the valve 40 on the resin inlet line 38 is opened, allowing mixed regenerated resin to flow smoothly into the service column 10. The liquid discharge outlet 22 is then closed, and the column is repressurized by delivering water under pressure through the raw water inlet 18 upwardly through the resin, resuming normal operation. Provided that the valve 30 on the exhausted resin transfer line 28 is open, the gap 26 will be reformed, as resin is forced out of the service column 10 through the exhausted resin transfer line 28 to the separation column 12.

As previously mentioned, the separation column 12 separates resins according to their densities by delivering water through the column in an upflow direction at a controlled rate of speed. Water enters the separation column 12 through a water inlet line 42 communicating with a lower portion thereof, and passes upwardly through the separation column 12 to a water outlet line 44 communicating with an upper portion. The water passes through the water outlet line 44 to a separation column head tank 46, which maintains the proper pressure head within the separation column 12. The water is removed from the head tank 46 through a water outlet line 48. In the preferred embodiment, the separation tank 12 has a relatively narrow lower portion and a relatively wider upper portion, so that the flow rate through a given area will be higher in the lower portion than it is in the upper portion. Thus, the flow rate is higher through the more dense cation resin than it is through the less dense anion resin. This variation in flow rates enhances the efficiency of separation.

Cation resin is withdrawn at the bottom of the separation column through a cation resin outlet pipe 50 which communicates with a cation resin regeneration hopper 52 above the cation regeneration column 14. Similarly, the anion resin is withdrawn from an upper portion of the separation column 12 and transferred through an anion resin outlet pipe 54 to an anion resin regeneration hopper 56 above the anion regeneration column 16. Resin is delivered from the regeneration hoppers 52, 56 to the regeneration columns 14, 16, respectively, through resin transfer pipes 58.

Both of the regeneration columns operate in a similar manner. Regenerant is delivered to each column 14, 16 through a regenerant inlet line 60. Water is delivered to the columns through a water inlet line 62 located below the regenerant inlet line 60. Both the water and the regenerant are withdrawn from each column through an upper outlet line 64. Because water is introduced into the regeneration columns 14, 16 below the regenerant, the resin is washed before it is removed from the regeneration columns 14, 16.

Resin is transferred from the regeneration columns 14, 16 through regenerated resin pipes 66 communicating with a cation and anion resin metering hoppers 32, 34 respectively. The size of these metering hoppers 32, 34 determines the amount of resin that will be delivered before the metering hoppers 32, 34 are emptied. For this reason, the hoppers 32, 34 are termed "metering" hoppers.

Returning to the separation column 12, in accordance with the present invention, the separation column is provided with an internal bead resin level sensor 70 and a fines level sensor 72 positioned above the bead resin level sensor 70 within the separation column 12. In the most preferred embodiment of the present invention, the separation column 12 also has an internal minimum bead resin level sensor 74 positioned within the column below the bead resin level sensor 70. All three sensors 70, 72, 74 are connected to control means 76 by electric wires 78. A fines blowoff line 80 having a valve 82 communicates with an upper portion of the separation column 12 above the normal level of the resin. The valve 82 is also connected to the control means 76 by means of electric wires 78. Finally, the valve 30 on the exhausted resin transfer line 28 is likewise connected to the control means 76 by electric wires 78.

In operation, it is normally desired to maintain the level of bead resin 24 within the separation column 12 relatively constant at the level of the bead resin level sensor 70. The maintenance of a constant resin level within the separation column 12 aids in insuring maximum separation efficiency between the cation and anion resins. The bead resin level sensor 70 is designed to give either a "yes" or "no" signal. That is, it signals either "bead resin present" or "no bead resin present." When the resin level sensor 70 signals "no resin present," the valve 30 will be opened, and resin is delivered to the separation column 12 through the exhausted resin transfer line 28 for a predetermined period of time, as established by a timer 86 in the control means 76. This time period should be sufficient to allow the bead resin level sensor 70 to be covered by bead resin under normal operating conditions. At the end of this predetermined time interval, the bead resin level sensor 70 will again make a reading to determine the presence of resin. If resin is present, the valve 30 on the exhausted resin transfer line 28 is closed, and the delivery of resin is halted. If, however, the time interval is insufficient to cover the resin level sensor 70, the delivery of resin through the exhausted resin transfer line 28 is continued for another interval as determined by the times 86. This sequence is continued until a signal is received indicating that the bead resin level sensor 70 is covered by resin 24.

Because of the upflow of water within the separation column 12, and the constant handling of the resin 24 within the ion exchange system, the development of finely divided resin particles is unavoidable. These finely divided resin particles, mixed with other particulate impurities that may have been removed from water in the service column 10, forms a cloudy layer of finely divided materials, referred to collectively as "fines" above the level of the resin 24 within the service column 12. Periodically, it is necessary to remove these fines in order to prevent contamination of the resin. These fines are simply removed by opening the valve 82 in the fines blowoff pipe 80, which communicates with an upper portion of the separation column 12. Because the fines blowoff pipe 80 bypasses the separation column head tank 46, a relatively rapid surge of water will be delivered to the fines blowoff pipe 80, allowing fines to be removed from the area above the resin 24.

The fines level sensor 72 is located at a level corresponding to the maximum amount of fines permitted in the separation column 12 before they are removed. As with the bead resin level sensor 70, the fines level sensor 72 provides a "yes" or "no" signal. When the fines level sensor 72 indicates the presence of fines, the control means 76 will deliver a signal to the valve 82 on the fines blowoff pipe 80, opening the valve 82, and allowing fines to be blown off for a predetermined period of time. At the end of this predetermined time period, the valve 82 will be closed, and the fines level sensor 72 will take another reading. If the sensor 72 still indicates the presence of fines, the valve 82 will be reopened and the cycle repeated.

As an alternative embodiment, the valve 82 may be a manual valve, and the fines level sensor 72 can be operatively connected to provide an alarm signal, as for example from an alarm horn 88. This alternative embodiment has the disadvantage that fines must be manually blown off. However, it increases the versatility of the apparatus. For example, the fines level sensor 72 may be providing a continuous signal because of some malfunction in the device, indicating that the level of the bead resin 24 has risen to the level of the fines level sensor 72. Such a malfunction would require immediately operator attention. Of course, both an alarm horn 88 and an automatic valve 82 could be provided, the alarm horn sounding only if an excessive number of openings of the valve 82 were required within a short time interval, indicating that the level of the bead resin may have reached the fines level sensor 72.

The optional minimum bead resin level sensor 74 operates in the same manner as the bead resin level sensor 70. This minimum bead resin level sensor 74 serves as a safety device, in case the bead resin level sensor 70 becomes clogged, and indicates the presence of resin when none is actually present. If the level of the resin passes the minimum bead resin level sensor 74, the alarm horn 88 is again sounded indicating that operator attention is required. Alternatively, or in addition to sounding the alarm horn 88, the minimum resin level sensor 74 can be operatively connected through the control means 76 to open the valve 30 in the exhausted resin transfer line 28, raising the resin level an amount sufficient to cover the minimum resin bead sensor 74.

The precise design of the various sensors 70, 72, 74 is not critical, so long as each is adapted to properly perform its function. Sonic-type sensors have been found to be particularly suitable for sensing the presence of bead resin without sensing the presence of fines, and are therefore well adapted to serve as the bead resin level sensor 70 or as the minimum bead resin level sensor 74. Such sensors are well known in the art, and generally comprise an ultrasonic emitter and a receiver. The emitter and receiver may have a gap between them, or may be in the same unit with a gap spaced from them and a reflection plate on the opposite side of the gap. The presence of the bead resin within the gap is sensed by an interruption of the sonic signal. A suitable sonic probe for use in the present invention is the "Sensall" sensor manufactured by National Sonics Corporation of Farmingdale, New York.

Because the presence of fines above the level of the bead resin 24 tends to generate a dark cloud, a light emitter and photocell with a gap in between them is particularly suitable as the fines level sensor 72. The presence of fines will interrupt the light beam through the gap. A suitable commercially available photoelectric sensor is the Photoelectric Bin Level Control, Model A-700A, manufactured by Autotron, Incorporated, Danville, Illinois.

The method and apparatus of the present invention are adaptable to use with a wide variety of anion and cation resins, so long as they differ in density (when exhausted) a sufficient amount to permit them to be separated in the separation column 12. Typical solid cation exchange resins that may be employed in the present invention are those of the divinylbenzene-styrene copolymer type, the acrylic type, the sulfonated coal type, and the phenolic type. These may be used in the sodium, hydrogen, ammonium, or hydrazine form, for example, although they are generally used in the hydrogen form. Typical solid anion exchange resin particles that may be employed in the present invention are the phenol-formaldehyde type, the divinylbenzene-styrene copolymer type, the acrylic type, and the epoxy type. The anion resin beads may be used in the hydroxide or chloride form, for example. The anion and cation resins are preferably employed as beads in the size range of about 16—60 mesh. Suitable bead resins are sold under the trade names Amberlite IS-120 and Amberlite IRA-400, manufactured and sold by Rohm & Haas Company, and Nalco HCR and Nalco SDR-P, sold by Nalco Chemical Company.

Obviously, many modifications and variations of the invention as hereinbefore set forth will occur to those skilled in the art, and it is intended to cover in the appended claims all such modifications and variations as fall within the true spirit and scope of the invention.

I claim:

1. A method for simultaneously controlling bead resin level and fines level in a resin separation zone, said zone being filled with liquid and containing ion exchange resin, said method comprising: sensing the presence or absence of bead resin at a given level within said zone; controlling the delivery of resin into said zone in response to the absence or presence of bead resin at said given level to maintain said level of bead resin relatively constant at said given level; sensing the presence or absence of fines in said zone at a second level above said given level; and sounding an alarm when fines are sensed at said second level.

2. The method as defined in claim 1 wherein said bead resin is sensed at said given level by sonic sensing means.

3. The method as defined in claim 2 wherein said fines are sensed at said second level by photoelectric sensing means.

4. A method for simultaneously controlling bead resin level and fines level in a resin separation zone, said zone being filled with liquid and containing ion exchange resin, said method comprising: sensing the presence or absence of bead resin at a given level within said zone; controlling the delivery of resin into said zone in response to the absence or presence of bead resin at said given level to maintain said level of bead resin relatively constant at said given level; sensing the presence or absence of fines in said zone at a second level above said given level; and removing fines from an upper portion of said separation zone when said fines are sensed at said second level.

5. The method as defined in claim 4 wherein said bead resin is sensed at said given level by sonic-sensing means.

6. The method as defined in claim 5 wherein said fines are sensed at said second level by photoelectric-sensing means.

7. In an ion exchange resin separation column, control means comprising: a bead resin level sensor positioned in an upper portion of said separation column; a fines level sensor positioned in said column above said bead resin level sensor; resin transfer means for delivering exhausted ion exchange resin to said column; valve means on said resin transfer means; control means for operating said valve means responsive to a signal from said bead resin level sensor; and alarm means operating responsive to said fines level sensor.

8. The apparatus as defined in claim 7 wherein said bead resin level sensor comprises a sonic level detector.

9. The apparatus as defined in claim 8 wherein said fines level sensor comprises a light emitter and a photocell.

10. The apparatus as defined in claim 7 further including a minimum bead resin level sensor positioned below said bead resin level sensor; and control means for sounding an alarm responsive to a signal from said minimum resin level sensor.

11. The apparatus as defined in claim 10 further including control means for opening said valve responsive to a signal from said minimum resin level sensor.

12. The apparatus as defined in claim 10 wherein said bead resin level sensor and said minimum resin level sensor are sonic level detectors.

13. The apparatus as defined in claim 12 wherein said fines level sensor comprises a light emitter and a photocell.

14. In an ion exchange resin separation column, control means comprising: a bead resin level sensor positioned in an upper portion of said separation column; a fines level sensor positioned in said column above said bead resin level sensor; resin transfer means for delivering exhausted ion exchange resin to said column; valve means on said resin transfer means; control means for operating said valve means responsive to a signal from said bead resin level sensor; and means for removing fines from an upper portion of said column responsive to a signal from said fines level sensor.

15. The apparatus as defined in claim 14 wherein said bead resin level sensor comprises a sonic level detector.

16. The apparatus as defined in claim 15 wherein said fines level sensor comprises a light emitter and a photocell.

17. The apparatus as defined in claim 14 further including a minimum bead resin level sensor positioned below said bead resin level sensor; and control means for sounding an alarm responsive to a signal from said minimum resin level sensor.

18. The apparatus as defined in claim 17 wherein said control means open said valve responsive to a signal from said minimum resin level sensor.

19. The apparatus as defined in claim 17 wherein said bead resin level sensor and said minimum resin level sensor are sonic detectors.

20. The apparatus as defined in claim 19 wherein said fines level sensor comprises a light emitter and a photocell.